(12) United States Patent
Mahalanobish (10) Patent No.: US 11,500,936 B2
(45) Date of Patent: Nov. 15, 2022

(54) SYSTEM AND METHOD FOR STRUCTURE AND ATTRIBUTE BASED GRAPH PARTITIONING

(71) Applicant: Walmart Apollo, LLC, Bentonville, AR (US)

(72) Inventor: Omker Mahalanobish, Kolkata (IN)

(73) Assignee: Walmart Apollo, LLC, Bentonville, AR (US)

( * ) Notice: Subject to any disclaimer, the term of this patent is extended or adjusted under 35 U.S.C. 154(b) by 112 days.

(21) Appl. No.: 16/534,570

(22) Filed: Aug. 7, 2019

(65) Prior Publication Data

US 2020/0050889 A1    Feb. 13, 2020

Related U.S. Application Data

(60) Provisional application No. 62/779,095, filed on Dec. 13, 2018.

(30) Foreign Application Priority Data

Aug. 7, 2018    (IN) .............................. 201811029683

(51) Int. Cl.
*G06F 16/901* (2019.01)
*G06F 16/22* (2019.01)
*G06F 16/9035* (2019.01)

(52) U.S. Cl.
CPC ...... *G06F 16/9027* (2019.01); *G06F 16/2228* (2019.01); *G06F 16/9035* (2019.01)

(58) Field of Classification Search
CPC ............... G06F 16/9027; G06F 16/322; G06F 16/9035; G06F 16/2228

(Continued)

(56) References Cited

U.S. PATENT DOCUMENTS 7,406,436 B1    7/2008 Reisman
8,001,121 B2 *  8/2011 Wang .................... G06F 16/951
                                                          707/706

(Continued)

OTHER PUBLICATIONS

International Search Report and Written Opinion dated Oct. 22, 2019 in corresponding International Application No. PCT/US2019/045524, 14 pages.

(Continued)

*Primary Examiner* — Usmaan Saeed
*Assistant Examiner* — Jessica N Le
(74) *Attorney, Agent, or Firm* — Morgan, Lewis & Bockius LLP; Manita Rawat (57) ABSTRACT

Systems and methods for performing structure and attribute based graph partitioning. An exemplary system can receive a plurality of transactions, with each transaction identifying a point of sale and an item exchanged by the transaction. The system can generate a structure graph of the plurality of transactions and receive a request to partition the structure graph into sub-categories. The system can then retrieve, from a database, attributes of each respective structure vertex in the structure vertices. Using those attributes and the structure graph, the system can generate a structure-attribute graph. The system can then generate a unified neighborhood matrix of the structure-attribute graph; and partition the structure graph based on the unified neighborhood matrix.

14 Claims, 6 Drawing Sheets

(58) Field of Classification Search
USPC .......................................................... 707/737
See application file for complete search history.

(56) References Cited

U.S. PATENT DOCUMENTS

| | | | |
|---|---|---|---|
| 8,412,656 | B1 | 4/2013 | Baboo et al. |
| 8,874,499 | B2 | 10/2014 | Tiwari et al. |
| 9,092,516 | B2 * | 7/2015 | Ilyas .................. G06F 16/9535 |
| 9,158,847 | B1 * | 10/2015 | Majumdar .............. G06F 16/22 |
| 9,619,831 | B1 * | 4/2017 | Kumar .................. G06Q 20/20 |
| 9,830,328 | B2 | 11/2017 | Faith et al. |
| 10,152,557 | B2 * | 12/2018 | Banadaki ................ G06F 16/90 |
| 10,956,521 | B1 * | 3/2021 | Yu ...................... G06F 16/9535 |
| 2003/0050915 | A1 * | 3/2003 | Allemang ........... G06F 16/9024 |
| 2006/0190225 | A1 * | 8/2006 | Brand ................ G06F 16/9535 |
| | | | 703/2 |
| 2007/0263544 | A1 * | 11/2007 | Yamanaka .............. H04L 45/12 |
| | | | 370/252 |
| 2009/0125543 | A1 | 5/2009 | Patil et al. |
| 2010/0145773 | A1 | 6/2010 | Desai et al. |
| 2011/0035347 | A1 * | 2/2011 | Shama ..................... G06N 5/04 |
| | | | 706/21 |
| 2011/0301582 | A1 * | 12/2011 | Farrer ................ A61F 9/00827 |
| | | | 606/5 |
| 2012/0191527 | A1 | 7/2012 | Reichert et al. |
| 2013/0066827 | A1 * | 3/2013 | Maruhashi .......... G06F 16/2465 |
| | | | 707/602 |
| 2013/0097138 | A1 * | 4/2013 | Barkol .............. G06F 16/24544 |
| | | | 707/706 |
| 2013/0097320 | A1 * | 4/2013 | Ritter .................... G06Q 10/06 |
| | | | 709/226 |
| 2014/0122506 | A1 * | 5/2014 | Jebara .................. G06Q 10/04 |
| | | | 707/748 |
| 2014/0180790 | A1 * | 6/2014 | Boal .................. G06Q 30/0245 |
| | | | 705/14.42 |
| 2014/0200958 | A1 | 7/2014 | Wagenblatt |
| 2014/0258196 | A1 | 9/2014 | Dhurandhar et al. |
| 2014/0372413 | A1 * | 12/2014 | Banner ............. G06F 16/90335 |
| | | | 707/722 |
| 2016/0012088 | A1 * | 1/2016 | Rossi .................. G06F 16/2237 |
| | | | 707/736 |
| 2016/0063037 | A1 * | 3/2016 | Savkli .................. G06F 16/245 |
| | | | 707/722 |
| 2016/0162913 | A1 * | 6/2016 | Linden .............. G06Q 30/0202 |
| | | | 705/7.31 |
| 2016/0342751 | A1 * | 11/2016 | Alstad ..................... G16H 40/20 |
| 2016/0350834 | A1 * | 12/2016 | Wilson .................. G06N 3/084 |
| 2016/0364794 | A1 * | 12/2016 | Chari .................... G06Q 40/02 |
| 2017/0053294 | A1 * | 2/2017 | Yang .................. G06F 16/9024 |
| 2017/0140262 | A1 * | 5/2017 | Wilson .................... H04L 67/22 |
| 2017/0186057 | A1 * | 6/2017 | Metnick ................ G06Q 20/34 |
| 2017/0200172 | A1 * | 7/2017 | Wu ..................... G06Q 30/0201 |
| 2017/0221240 | A1 * | 8/2017 | Stetson ................. G06T 11/206 |
| 2017/0255708 | A1 * | 9/2017 | Cho ........................ G06F 16/22 |
| 2017/0262521 | A1 | 9/2017 | Cho et al. |
| 2017/0336219 | A1 * | 11/2017 | Di Lorenzo ....... G01C 21/3453 |
| 2018/0052885 | A1 * | 2/2018 | Gaskill .................. G06N 5/022 |
| 2018/0075035 | A1 * | 3/2018 | Carlyle ................ G06F 16/212 |
| 2018/0137155 | A1 * | 5/2018 | Majumdar .......... G06F 16/9024 |
| 2018/0218372 | A1 | 8/2018 | Prendki |
| 2019/0236186 | A1 * | 8/2019 | Kritika ................ G06F 16/9536 |
| 2019/0370031 | A1 * | 12/2019 | Xiao ...................... G06T 13/80 |

OTHER PUBLICATIONS

Kim, M. et al., "SBV-Cut: Vertex-Cut based Graph Partitioning using Structural Balance Vertices", Data Knowledge Engineering, vol. 72, Feb. 2012, 32 pages.
Omker Mahalanobish, "Structure & Attribute Based Graph Partitioning," Walmart Assortment Analytics, pp. 1-11.

* cited by examiner

SYSTEM AND METHOD FOR STRUCTURE AND ATTRIBUTE BASED GRAPH PARTITIONING

PRIORITY

The present application claims priority to Indian Provisional Patent Application 201811029683, filed Aug. 7, 2018, and U.S. Provisional Patent Application 62/779,095 filed Dec. 13, 2018, the contents of which are incorporated herein in their entirety.

BACKGROUND

1. Technical Field

The present disclosure relates to combining structural and attribution based graph partitioning to electronic database records to create new associations between different types of data.

2. Introduction

Electronic data may be represented in graphical form using a dendrogram, a tree structure having hierarchical clustering. Within a dendrogram, items which are closely related to another item may be separated by only a common parent branch, whereas items which are not closely related may be separated by many branches. The items, such as items in a store, may be arranged into a hierarchy in a dendrogram generally using one of two methods. Either the items are clustered based on how similar they are to one another (e.g., types of breakfast cereals may be considered clustered closely, but far away from types of milk) or based on how frequently they are found together (e.g., milk is commonly purchased with breakfast cereals, and therefore milk and breakfast cereal are clustered closely together). However, such disparate clustering systems can lead to duplication or inefficiencies in combining database records regarding one type of data, such transaction records, with database records regarding attribute information, such as information regarding the particular item.

TECHNICAL PROBLEM

To infuse the electronic database records of product attributes with the database records on point of sale information within the domain of graph theory when the association between the two different types of database records are rare, thus creating new data associations.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method configured as disclosed herein can include: receiving a plurality of transactions, each transaction identifying a point of sale and an item exchanged by the transaction; generating, via a processor, a structure graph of the plurality of transactions; receiving a request to partition the structure graph into sub-categories; retrieving, from a database, attributes of each respective structure vertex in the structure vertices; generating, via the processor, a structure-attribute graph using the structure graph and the attributes; generating a unified neighborhood matrix of the structure-attribute graph; and partitioning the structure graph based on the unified neighborhood matrix.

An exemplary system configured as disclosed herein can include: a processor; and a computer-readable storage medium having instructions stored which, when executed by the processor, cause the processor to perform operations including: receiving a plurality of transactions, each transaction identifying a point of sale and an item exchanged by the transaction; generating a structure graph of the plurality of transactions; receiving a request to partition the structure graph into sub-categories; retrieving, from a database, attributes of each respective structure vertex in the structure vertices; generating a structure-attribute graph using the structure graph and the attributes; generating a unified neighborhood matrix of the structure-attribute graph; and partitioning the structure graph based on the unified neighborhood matrix.

An exemplary non-transitory computer-readable storage medium configured as disclosed herein can include instructions which, when executed by a computing device, cause the computing device to perform operations including: receiving a plurality of transactions, each transaction identifying a point of sale and an item exchanged by the transaction; generating a structure graph of the plurality of transactions; receiving a request to partition the structure graph into sub-categories; retrieving, from a database, attributes of each respective structure vertex in the structure vertices; generating a structure-attribute graph using the structure graph and the attributes; generating a unified neighborhood matrix of the structure-attribute graph; and partitioning the structure graph based on the unified neighborhood matrix.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

Embodiments of the invention may provide a number of methods to build different types of data relationships according to different conditions related to different data associations, such as purchase frequency, availability of attributes of items, availability of linked-transactions, transaction data quality, different transaction situations (e.g., sales market), etc. In one example, database records regarding point of sale information can be combined with database records regarding attributes of items in the transaction, such as availability, loyalty, brand, color, size, material, durability, etc. The method is then applied to the different types of data, creating new associations among the data. These new associations may be stored in a database. A graphical presentation of the associations may be generated and may be displayed by a computing device. The graphical presentation may be a data structure.

The disclosed systems and methods combine structural graph partitioning and attribute-based graph partitioning such that a graph is partitioned based on both its structure and its attributes. With respect to transactions, a structure graph of the transaction can relate how the respective transactions relate to one another based on the entity performing the transaction (e.g., did the same person buy two or more distinct items within a predetermined time period), whereas an attribute graph of the transactions can identify common attributes of the transactions (e.g., were different types of an item purchased, such as different types of batteries or apples). By combining structural and attribute-based graph partitioning, sub-graphs can be defined out of the parent graph, where each of the sub-graphs can have similarly attributed and densely connected vertices.

Figure 1:
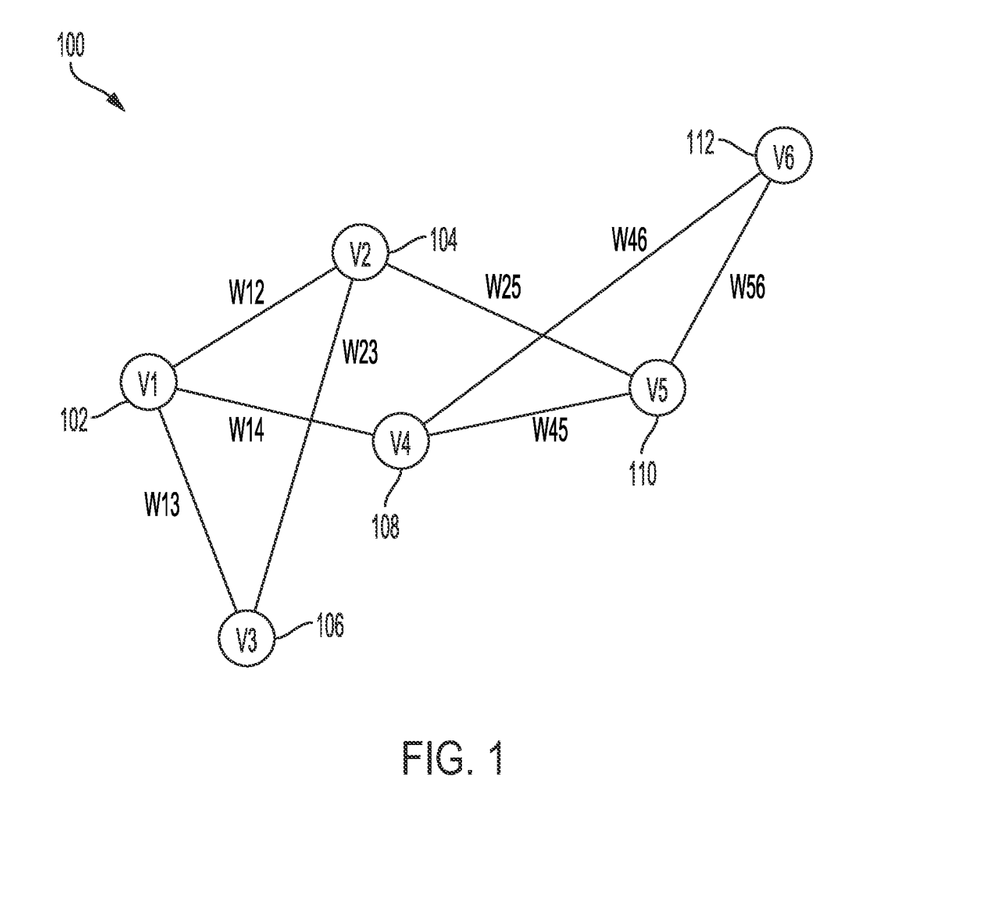
FIG. 1 illustrates an example graph.

First, a parent graph G is defined, where G has inputs V (a vertex set), E (an edge set), and W (a matrix of edge weights). This can be expressed as G=(V, E, W). FIG. 1 illustrates an example graph G 100 with six vertices 102-112, eight edges extending between the vertices, and edge-weights $w_{ij}$. On the graph G, each vertex V has information regarding n attributes. The relative importance of each attribute (the attribute weight) can also be known, which can be defined as $a_i$, where i extends from 1, 2, . . . , n. The individual attributes may also have levels within them.

$V_A$ can be used to define the set of vertices V with attributes A, and $W_A$ can be the list of attribute weights. As an example of $V_A$, consider the following table which illustrates the graph G 100 of FIG. 1, where n=2 attributes, A and B. There are within A, two sub-attributes of A (A1 and A2), while B has three sub-attributes (B1, B2, and B3).

TABLE 1

| Vertex | Attribute A | Attribute B |
|--------|-------------|-------------|
| V1 | A1 | B1 |
| V2 | A1 | B1 |
| V3 | A1 | B2 |
| V4 | A2 | B2 |
| V5 | A2 | B3 |
| V6 | A2 | B3 |

Figure 2:
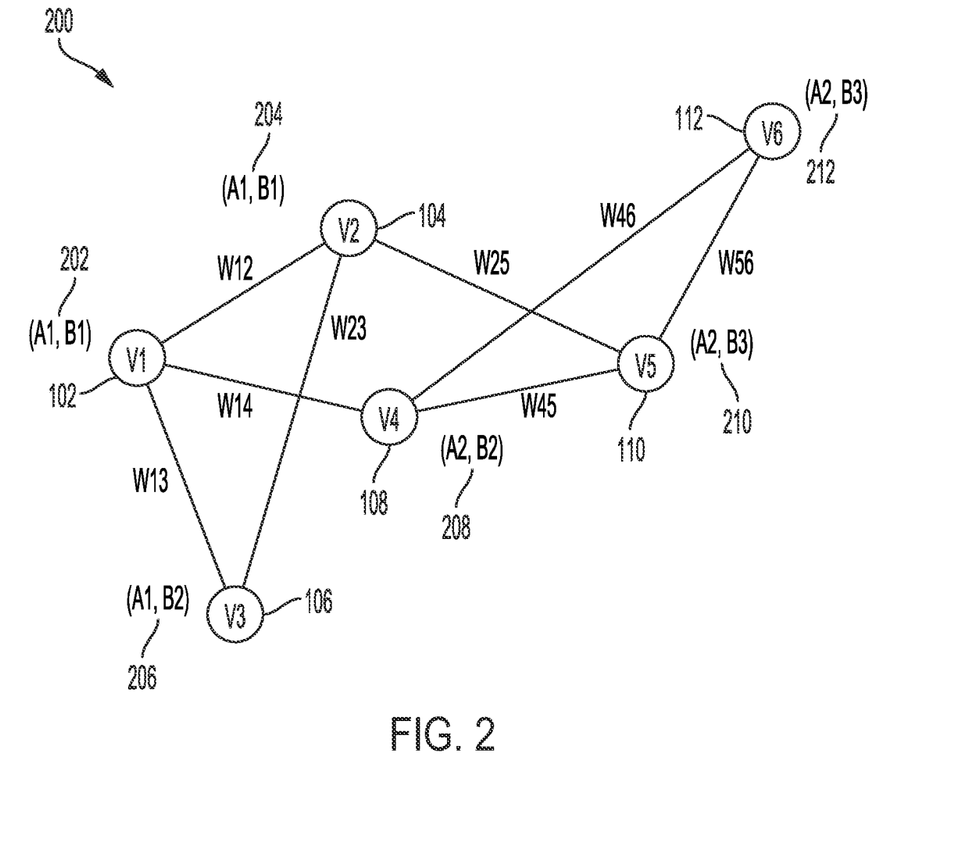
FIG. 2 illustrates the example graph with attributes.

FIG. 2 illustrates the example graph 100 of FIG. 1 with the attributes of Table 1, forming new graph 200. As illustrated, each respective vertex 102-112 now has a corresponding set of attributes 202-212.

The next step is to overlay the parent graph G 200 with an attributed graph $G_A$ to create a new graph G* made of vertices V*, edges E*, and edge weights W*. In order to do this, new vertices corresponding to the respective attributes (or sub-attributes) are introduced in addition to the original vertices V of graph G. In other words, V*=V ∪ {attribute vertices}

From each attribute vertex, an edge is added to each original vertex V (henceforth referred to as a "structural vertex"). If a structural vertex pertains to the respective attribute, the edge linking the structural vertex to the attribute vertex is an "attribute edge." Thus, each structural vertex would have exactly n attribute edges, and E*=E ∪ {attribute edges}

The edge weight of each attribute edge can be defined per the attribute weights defined in $G_A$. Accordingly, $$W^* = \begin{pmatrix} W & 0 \\ 0 & \text{Diag}(W_A) \end{pmatrix}$$

Figure 3:
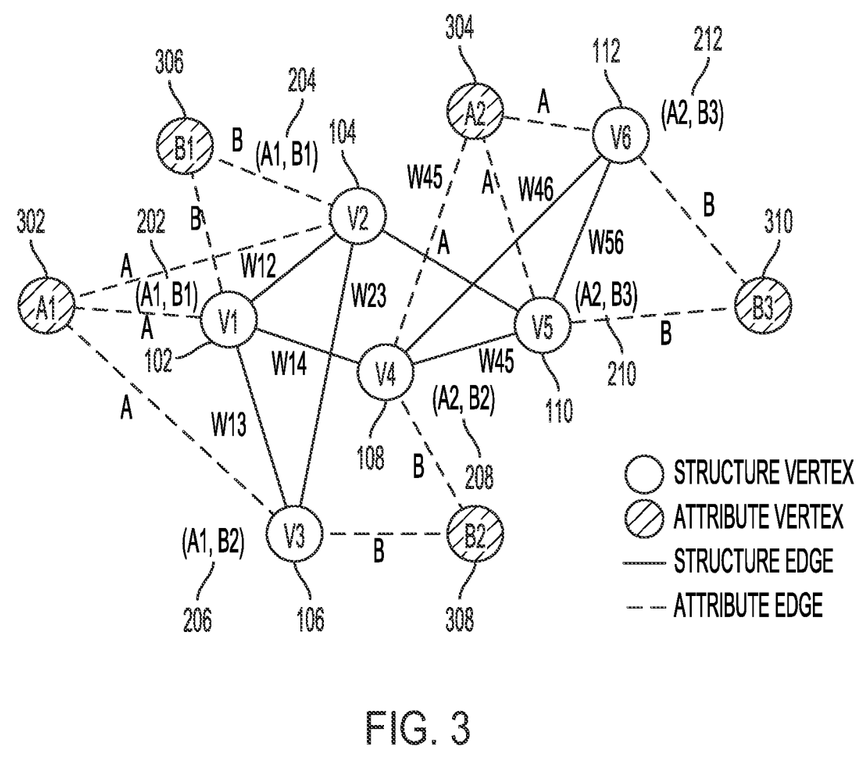
FIG. 3 illustrates the example graph augmented with attribute vertices.

FIG. 3 illustrates the example graph G*, which is the graph of FIG. 2 augmented with attribute vertices 302-310 and attribute edges connecting the attribute vertices 302-310 to the corresponding structural vertices 102-112.

At this point, with a graph which is a combination of structural and attribute vertices, we determine the probabilities associated with each vertex, and specifically the inter-relatedness of the vertices. To do this we use the concept of a random walk, where the likelihood of progressing from vertex to vertex within graph G* is calculated based on the respective weights of the edges (both structural edges and attribute edges). This calculation uses a Transition Probability Matrix $P_{ij}$, where $P_{ij}$ is the probability of going from vertex i to vertex j in a single step. $P_{ij}$ can be further defined as follows:

$P_{ij} = 0$ if there is no edge between vertex $i$ and vertex $j$ $= \dfrac{w_{ij}}{w_i + \sum_{t=1}^{n} a_t}$ if $i$ and $j$ are both structural vertices, where $w_i$ is the sum of edge-weights from vertex $i$ $= \dfrac{a_j}{w_i + \sum_{t=1}^{n} a_t}$ if $i$ is a structural vertex and $j$ is an attribute vertex, where $w_i$ is the sum of edge-weights from vertex $i$ $= \dfrac{1}{N_i}$ if $I$ is an attribute vertex and $j$ is a structural vertex, $N_i$ being a cardinality of attribute vertex $i$ $= 0$ if $i$ and $j$ are both attribute vertices Next, a Unified Neighborhood Matrix $R_{ij}$ is defined, where $R_{ij}$ is the probability of going from vertex i to vertex j (not in a single step). In this step, the calculation uses the following terms:
c=the likelihood of restarting the random walk
L=maximum possible length of the random walk Both c and L can be user defined, or can be defined based on machine learning through iterations, where the optimal values of c and L are determined based on the ultimate sizes of the clusters. With these values, $$R_{ij} = \sum_{t=1}^{L} (c \times (1-c)^t \times P^t)$$

The unified neighborhood matrix R is antonymous to a distance matrix. In order to create a distance matrix using $R_{ij}$, one could invert the R matrix, such that distance matrix $R^* = (1 - R_{ij})$ or $R^* = (1/R_{ij})$.

At this point, one can use clustering methods such as k-medoids, k-means, or other hierarchical clustering techniques on the structural vertices to obtain partitioned sub-graphs.

Consider the following example. Using randomly generated structural edge weights from a U(10, 50) distribution, and attribute weights from a U(80, 100) distribution, the following weights (corresponding to the eight structural edge weights illustrated in FIGS. 1-3) were randomly generated:

w12=26.60983
w13=27.13616
w14=13.86644
w23=15.31082
w45=37.38426
w46=49.21425
w45=37.61334
w56=47.53184

In addition, the value of edge weights a is randomly defined as 81.42791 and edge weights b are defined as 87.21310.

Using these values, the Transition Probability Matrix P is obtained as follows:

TABLE 2

|    | V1 | V2 | V3 | V4 | V5 | V6 | A1 | A2 | B1 | B2 | B3 |
|----|----|----|----|----|----|----|----|----|----|----|----|
| V1 | .00000000 | .1126326 | .11486038 | .05869308 | .00000000 | .00000000 | .3446634 | .00000000 | .3691506 | .00000000 | .00000000 |
| V2 | .10732112 | .0000000 | .06175066 | .00000000 | .1507758 | .00000000 | .3284100 | .00000000 | .3517424 | .00000000 | .00000000 |
| V3 | .12855375 | .0725329 | .00000000 | .00000000 | .00000000 | .00000000 | .3857534 | .00000000 | .00000000 | .4131599 | .00000000 |
| V4 | .05148399 | .00000000 | .00000000 | .00000000 | .1396526 | .1827250 | .00000000 | .3023294 | .00000000 | .3238090 | .00000000 |
| V5 | .00000000 | .1283930 | .00000000 | .12917981 | .00000000 | .1632440 | .00000000 | .2796572 | .00000000 | .00000000 | .2995259 |
| V6 | .00000000 | .00000000 | .00000000 | .18544327 | .1791038 | .00000000 | .00000000 | .3068269 | .00000000 | .00000000 | .3286260 |
| A1 | .33333333 | .33333333 | .33333333 | .00000000 | .00000000 | .00000000 | .00000000 | .00000000 | .00000000 | .00000000 | .00000000 |
| A2 | .00000000 | .00000000 | .00000000 | .33333333 | .33333333 | .33333333 | .00000000 | .00000000 | .00000000 | .00000000 | .00000000 |
| B1 | .50000000 | .50000000 | .00000000 | .00000000 | .00000000 | .00000000 | .00000000 | .00000000 | .00000000 | .00000000 | .00000000 |
| B2 | .00000000 | .00000000 | .50000000 | .50000000 | .00000000 | .00000000 | .00000000 | .00000000 | .00000000 | .00000000 | .00000000 |
| B3 | .00000000 | .00000000 | .00000000 | .00000000 | .50000000 | .50000000 | .00000000 | .00000000 | .00000000 | .00000000 | .00000000 |

The Uniform Neighborhood Matrix R can be calculated (using c=0.01 and L=200) as:

TABLE 3

|    | V1 | V2 | V3 | V4 | V5 | V6 | A1 | A2 | B1 | B2 | B3 |
|----|----|----|----|----|----|----|----|----|----|----|----|
| V1 | .11953529 | .12850168 | .09629598 | .06476368 | .06040560 | .04680830 | .13951215 | .04575139 | .11361697 | .05468103 | .03012792 |
| V2 | .12244188 | .11572738 | .08703393 | .06280282 | .07796109 | .05388924 | .13195969 | .05159177 | .10897197 | .05066554 | .03695469 |
| V3 | .10777618 | .10223086 | .10147261 | .08280234 | .06402703 | .05405745 | .13359499 | .05357294 | .06817012 | .09904729 | .03324820 |
| V4 | .05680896 | .05781536 | .06489530 | .11181891 | .12045259 | .11928692 | .05724062 | .12089246 | .03717646 | .08586090 | .06775151 |
| V5 | .04901264 | .06638769 | .04641727 | .1141963 | .12779008 | .13483319 | .05094077 | .12488312 | .03729997 | .04973079 | .10128485 |
| V6 | .04166978 | .05034765 | .04299711 | .12106146 | .14793274 | .13039042 | .04273470 | .13379479 | .02978265 | .05126892 | .10801978 |
| A1 | .13492600 | .13393798 | .11544076 | .06311065 | .06071812 | .04642650 | .12152005 | .04527483 | .08722771 | .06131816 | .03009924 |
| A2 | .04424741 | .05236521 | .04629290 | .13329000 | .14885262 | .14535316 | .04527483 | .11387111 | .03127772 | .05605818 | .08311684 |
| B1 | .15388972 | .15490308 | .08249846 | .05740493 | .06226501 | .04531389 | .12216233 | .04380442 | .10016502 | .04740596 | .03018718 |
| B2 | .07406331 | .07202080 | .11986556 | .13257956 | .08301583 | .07800497 | .08587603 | .07850943 | .04740596 | .08320869 | .04544987 |
| B3 | .4080709 | .05253090 | .04023647 | .10461649 | .16907527 | .16435063 | .04215396 | .11640506 | .03018718 | .04544987 | .09418708 |

Figure 4:
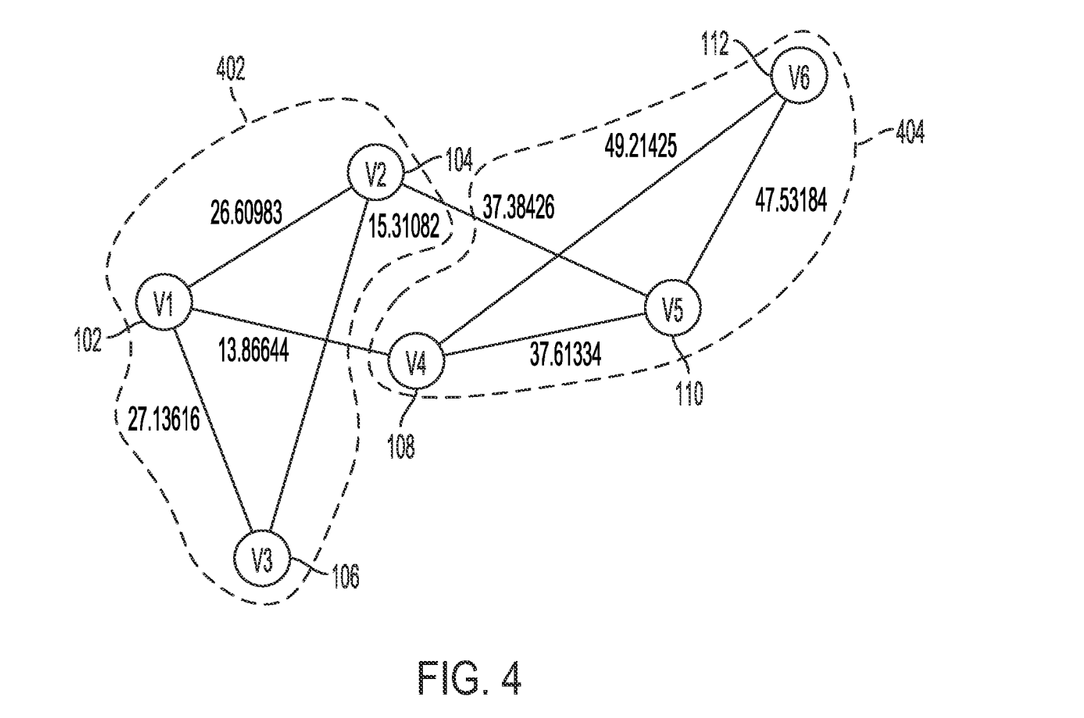
FIG. 4 illustrates the example graph partitioned into sub-categories.

By applying k-means and k-medoids processes to the structural-vertex sub-matrix of R*, we obtain the optimum number of clusters as two, as illustrated in FIG. 4. In this figure, the edge weights of the structural edges are present, and the vertices 102-112 are partitioned into group 402 and group 404. In some contexts, this can be further expanded to include infusing specific characteristics of item attributes into the structural graph G by labelling each vertex of the graph with corresponding item attributes (similar to that illustrated in FIG. 2), thereby returning an attribute incorporated structural graph to the received transaction data. By executing the processes described herein, an improved dendrogram can be produced. In the case of identifying items in a store based on both their common presence in transactions or based on their common attributes, the resulting dendrogram represents a hybrid customer behavioral tree having the benefits of both structural and attribute graphs.

Once the system has both the point of sale information as well as the item attributes, deploying the algorithm to specific stores, supply chains, or other locations can be readily performed. The novel features of this system—how to infuse the product attributes along with the point of sale information, within the domain of graph theory, so as to make the usual Graph Partitioning yield more accurate (improved) results—can provide results locally both locally and remotely. Furthermore, the clustering of items is just an example, it can also be extended successfully to other domains, where it is possible to obtain attribute information for each of the vertex, in a graph-like scenario.

Figure 5:
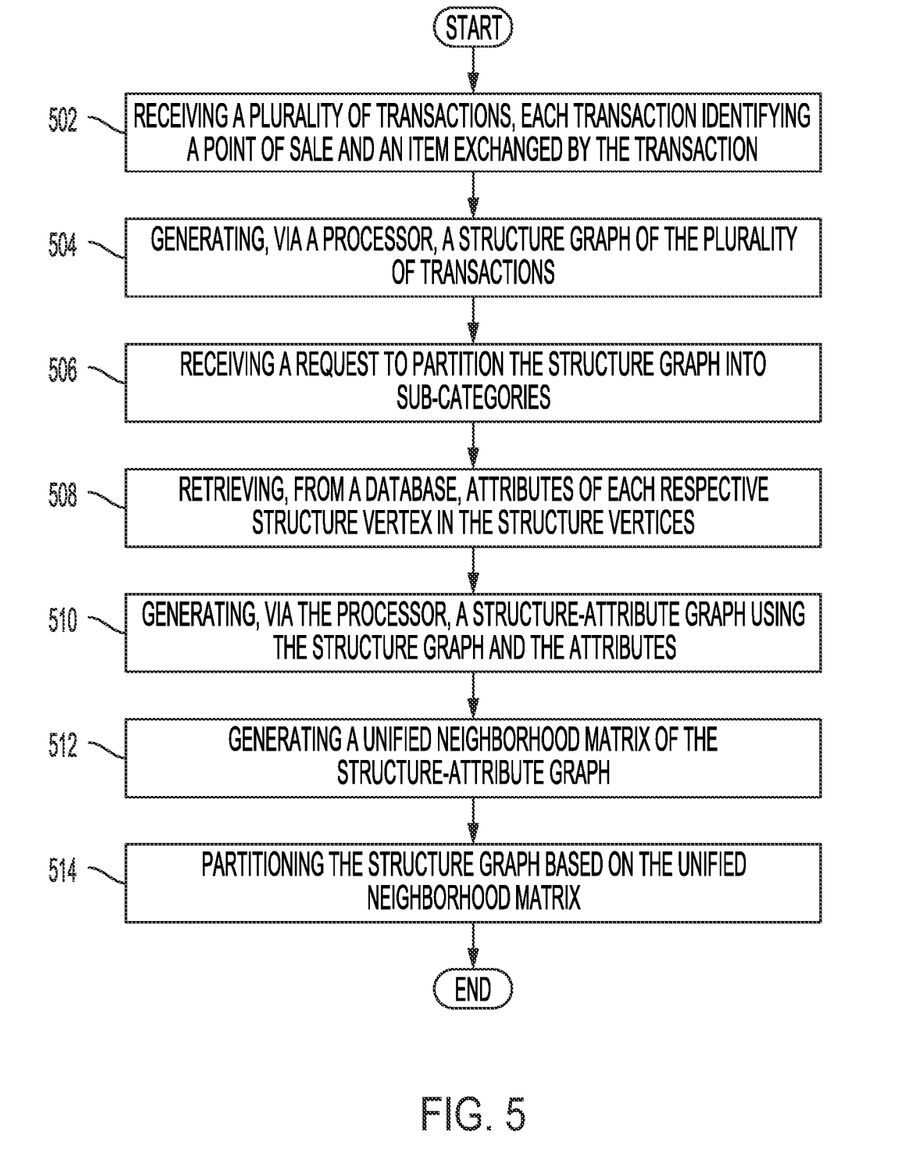
FIG. 5 illustrates an example method embodiment.

FIG. 5 illustrates an example method embodiment. In this example, the system performing the method receives a plurality of transactions, each transaction identifying a point of sale and an item exchanged by the transaction (502) and generates, via a processor, a structure graph of the plurality of transactions (504). The system also receives a request to partition the structure graph into sub-categories (506) and retrieves, from a database, attributes of each respective structure vertex in the structure vertices (508). The system generates, via the processor, a structure-attribute graph using the structure graph and the attributes (510) and generates a unified neighborhood matrix of the structure-attribute graph (512). The system then partitions the structure graph based on the unified neighborhood matrix (514).

In some configurations, the structure graph can further include: structure vertices associated with each respective type of item in the plurality of transactions; and structure edges between the structure vertices based on transactions having a common entity, wherein each structure edge in the structure edges extending between two structure vertices in the structure vertices, and wherein each structure edge in the structure edges has a structure weight. In addition, the structure-attribute graph can include: the structure vertices and the structure edges of the structure graph; attribute vertices associated with the attributes; and attribute edges between the attribute vertices and the structure vertices, wherein each attribute edge in the attribute edges has an attribute weight. Likewise, the structure weight can identify a substitutability of the two items linked by the structure edge.

In some configurations, the unified neighborhood matrix is based on a probability of moving, in a random walk through the structure-attribute graph, from one vertex to another vertex in a single step. Similarly, in some configurations, the unified neighborhood matrix is antonymous to a distance matrix of the structure-attribute graph.

In some configurations, partitioning the structure graph based on the unified neighborhood matrix generates a customer behavioral tree with items as leaf nodes.

The steps outlined herein are exemplary and can be implemented in any combination thereof, including combinations that exclude, add, or modify certain steps.

Figure 6:
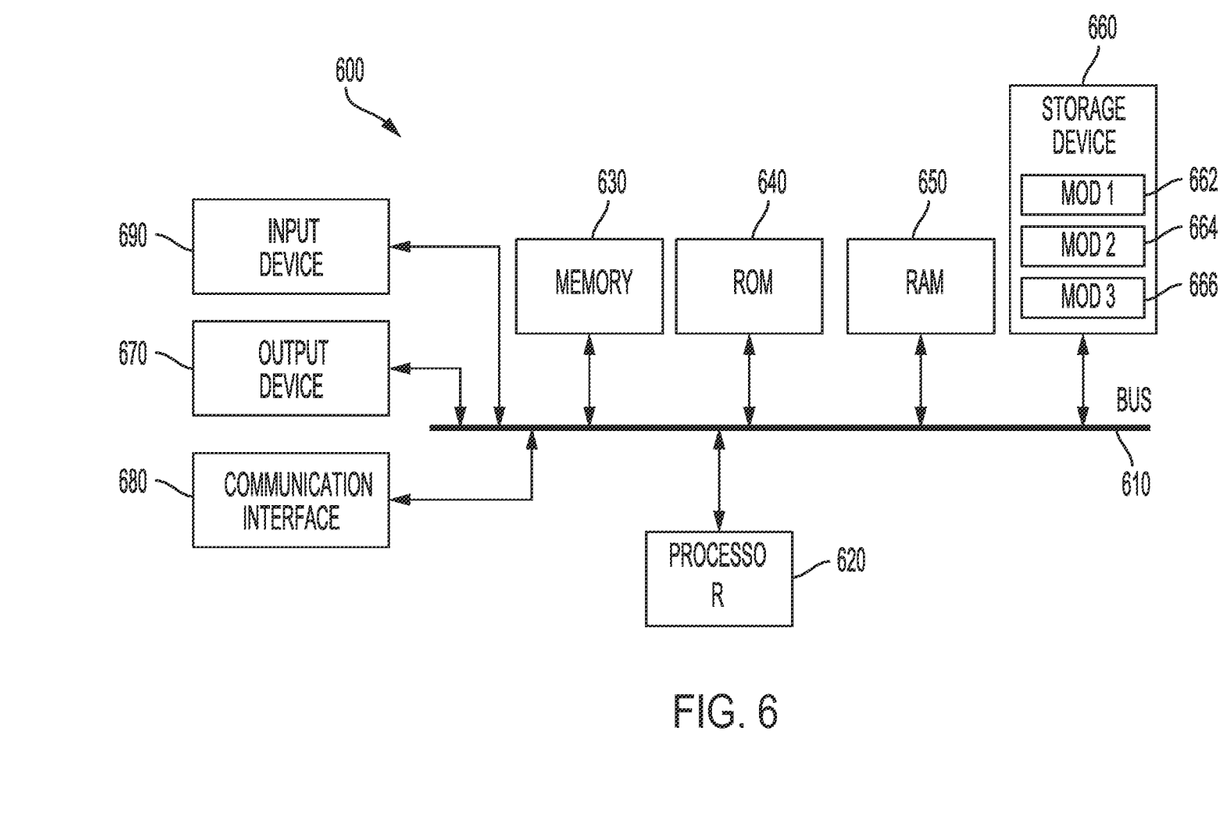
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The present disclosure addresses organizing items, and more specifically to using a combination of structural and attribution based graph partitioning to organize items. The concepts and principles disclosed herein can be applied to any circumstance where items needs to be clustered, organized, and/or partitioned. The methods disclosed herein can be used so as to capture both the purchase history as well as the product attributes, in a way which improves how items are organized based on purchase history by clustering numerical and categorical features. Existing clustering methods, may not work as a good substitute because:

1. Huge amount of sparsity in the purchase data (which is a characteristic feature of General Merchandise categories). That is, being able to recognize connections between purchases and individual items may be rare.

2. Presence of both integer as well as categorical data types leads to a need of complicated clustering algorithm, which requires a unique distance formula. The usual techniques use one-hot encoding before finding distances between categorical features, which might not capture the interaction between two different categorical features.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:

receiving transaction data of a first data type characterizing a plurality of transactions of a plurality of entities, each of the plurality of transactions identifying a point of sale and an item exchanged by the transaction and each item of the plurality of transactions being associated with an item type of a plurality of item types;

based at least in part on the transaction data, generating, via a processor, a structure graph of the plurality of transactions having the first data type, wherein the structure graph is a data structure comprising:

a plurality of structure vertices of the data structure, each of the set of structure vertices representing an item type of items of the plurality of transactions forms a structure vertex;

a plurality of structure edges of the data structure, each of the plurality of structure edges (i) extend between pairs of structure vertices of the plurality of structure vertices, (ii) are based on transactions having a common entity of the plurality of entities, and (iii) have a structure weight;

receiving a request to partition the structure graph into sub-categories;

retrieving, from a database, attribute data characterizing one or more attributes of each of the plurality of structure vertices, the attribute data being a second data type and the one or more attributes of each of the plurality of structure vertices having one or more commonalities with one another;

based on the structure graph and the attribute data, generating, via the processor, a structure-attribute graph including the plurality of structure vertices of the structure graph, the plurality of structure edges of the structure graph, and at least a plurality of attribute vertices, each of the plurality of the plurality of vertices representing a particular attribute of a particular one of the plurality of structure vertices;

generating a unified neighborhood matrix of the structure-attribute graph, wherein the unified neighborhood matrix is based on a probability of moving, in a random walk through the structure-attribute graph, from one vertex to another vertex in a single step;

based on the unified neighborhood matrix of the structure-attribute graph, partitioning the structure graph into a plurality of groups, each of the plurality of groups being based at least in part on the one or more commonalities between the one or more attributes of each of the plurality of structure vertices; and storing the partitioned structure graph in the data structure in the database based at least in part on the partitioning based on the unified neighborhood matrix of the structure-attribute graph.

2. The method of claim 1, wherein the structure-attribute graph further comprises:

attribute edges between the attribute vertices and the structure vertices, wherein each attribute edge in the attribute edges has an attribute weight.

3. The method of claim 1, wherein the structure weight identifies a substitutability of two items linked by the structure edge.

4. The method of claim 1, wherein the unified neighborhood matrix is antonymous to a distance matrix of the structure-attribute graph.

5. The method of claim 1, wherein partitioning the structure graph based on the unified neighborhood matrix generates a customer behavioral tree with items as leaf nodes.

6. A system comprising:

a processor; and a computer-readable storage medium having instructions stored which, when executed by the processor, cause the processor to perform operations comprising:

receiving transaction data of a first data type characterizing a plurality of transactions of a plurality of entities, each of the plurality of transactions identifying a point of sale and an item exchanged by the transaction and each item of the plurality of transactions being associated with an item type of a plurality of item types;

based at least in part on the transaction data, generating a structure graph of the plurality of transactions having the first data type, wherein the structure graph is a data structure comprising:

a plurality of structure vertices of the data structure, each of the set of structure vertices representing an item type of items of the plurality of transactions forms a structure vertex;

a plurality of structure edges of the data structure, each of the plurality of structure edges (i) extend between pairs of structure vertices of the plurality of structure vertices, (ii) are based on transactions having a common entity of the plurality of entities, and (iii) have a structure weight;

receiving a request to partition the structure graph into sub-categories;

retrieving, from a database, attribute data characterizing one or more attributes of each of the plurality of structure vertices, the attribute data being a second data type, and the one or more attributes of each of the plurality of structure vertices have one or more commonalities with one another;

based on the structure graph and the attribute data, generating a structure-attribute graph including the plurality of structure vertices of the structure graph, the plurality of structure edges of the structure graph, and at least a plurality of attribute vertices, each of the plurality of the plurality of vertices representing a particular attribute of a particular one of the plurality of structure vertices;

generating a unified neighborhood matrix of the structure-attribute graph, wherein the unified neighborhood matrix is based on a probability of moving, in a random walk through the structure-attribute graph, from one vertex to another vertex in a single step;

based on the unified neighborhood matrix of the structure-attribute graph, partitioning the structure graph into a plurality of groups, each of the plurality of groups being based at least in part on the one or more commonalities; and storing the partitioned structure graph in the data structure in the database based at least in part on the partitioning based on the unified neighborhood matrix of the structure-attribute graph.

7. The system of claim 6, wherein the structure-attribute graph further comprises:

attribute edges between the attribute vertices and the structure vertices, wherein each attribute edge in the attribute edges has an attribute weight.

8. The system of claim 6, wherein the structure weight identifies a substitutability of two items linked by the structure edge.

9. The system of claim 6, wherein the unified neighborhood matrix is antonymous to a distance matrix of the structure-attribute graph.

10. The system of claim 6, wherein partitioning the structure graph based on the unified neighborhood matrix generates a customer behavioral tree with items as leaf nodes.

11. A non-transitory computer-readable storage medium having instructions stored which, when executed by a computing device, cause the computing device to perform operations comprising:
- receiving transaction data of a first data type characterizing a plurality of transactions of a plurality of entities, each of the plurality of transactions identifying a point of sale and an item exchanged by the transaction and each item of the plurality of transactions being associated with an item type of a plurality of item types;
- based at least in part on the transaction data, generating a structure graph of the plurality of transactions having the first data type, wherein the structure graph is a data structure comprising:
  - a plurality of structure vertices of the data structure, each of the set of structure vertices representing an item type of items of the plurality of transactions forms a structure vertex;
  - a plurality of structure edges of the data structure, each of the plurality of structure edges (i) extend between pairs of structure vertices of the plurality of structure vertices, (ii) are based on transactions having a common entity of the plurality of entities, and (iii) have a structure weight;
- receiving a request to partition the structure graph into sub-categories;
- retrieving, from a database, attribute data characterizing one or more attributes of each of the plurality of structure vertices, the attribute data being a second data type and the one or more attributes of each of the plurality of structure vertices have one or more commonalities with one another the attributes;
- based on the structure graph and the attribute data, generating a structure-attribute graph including the plurality of structure vertices of the structure graph, the plurality of structure edges of the structure graph, and at least a plurality of attribute vertices, each of the plurality of the plurality of vertices representing a particular attribute of a particular one of the plurality of structure vertices;
- generating a unified neighborhood matrix of the structure-attribute graph, wherein the unified neighborhood matrix is based on a probability of moving, in a random walk through the structure-attribute graph, from one vertex to another vertex in a single step;
- based on the unified neighborhood matrix of the structure-attribute graph, partitioning the structure graph into a plurality of groups, each of the plurality of groups being based at least in part on the one or more commonalities; and
- storing the partitioned structure graph in the data structure in the database, based at least in part on the partitioning based on the unified neighborhood matrix of the structure-attribute graph.

12. The non-transitory computer-readable storage medium of claim 11, wherein the structure-attribute graph further comprises:
- attribute edges between the attribute vertices and the structure vertices,
- wherein each attribute edge in the attribute edges has an attribute weight.

13. The non-transitory computer-readable storage medium of claim 11, wherein the structure weight identifies a substitutability of two items linked by the structure edge.

14. The non-transitory computer-readable storage medium of claim 11, wherein the unified neighborhood matrix is antonymous to a distance matrix of the structure-attribute graph.

* * * * *